April 1, 1947.　　　A. BURROWS　　　2,418,332
GENERATOR TESTING STAND
Filed March 25, 1944　　　2 Sheets-Sheet 1
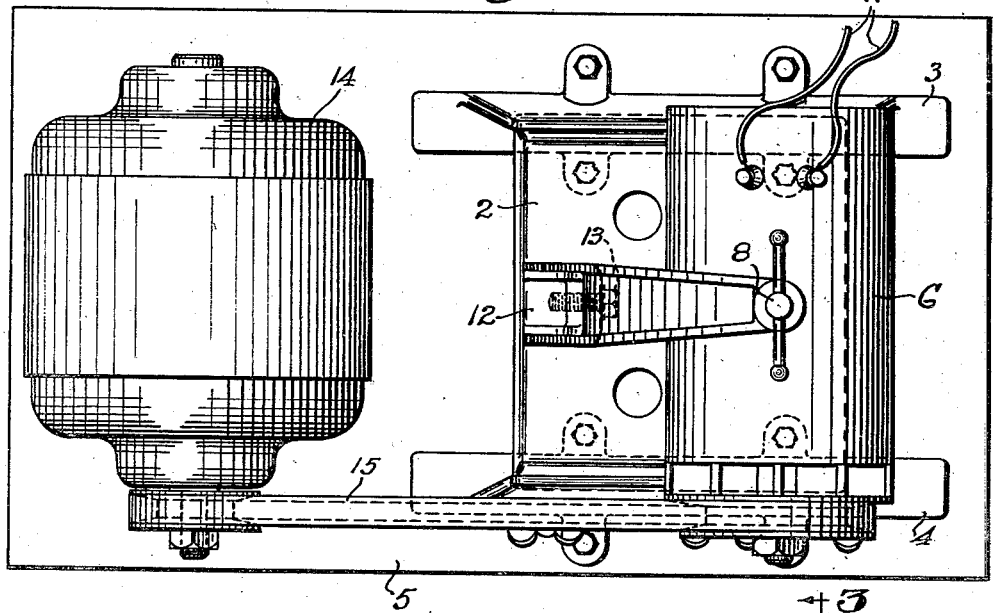
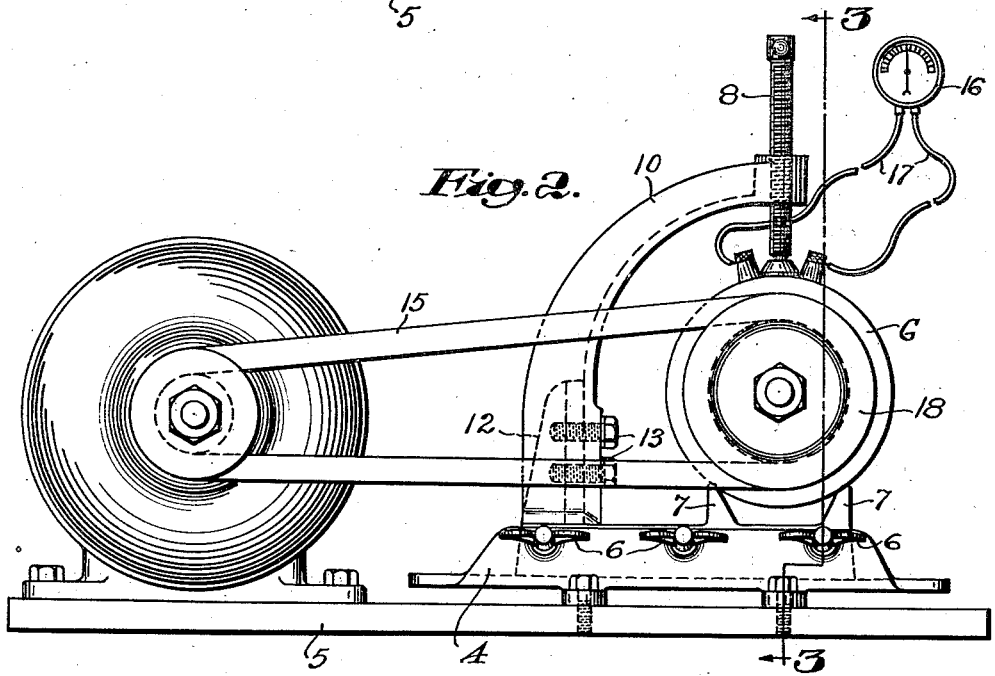

April 1, 1947.                A. BURROWS                 2,418,332
                          GENERATOR TESTING STAND
                         Filed March 25, 1944          2 Sheets-Sheet 2
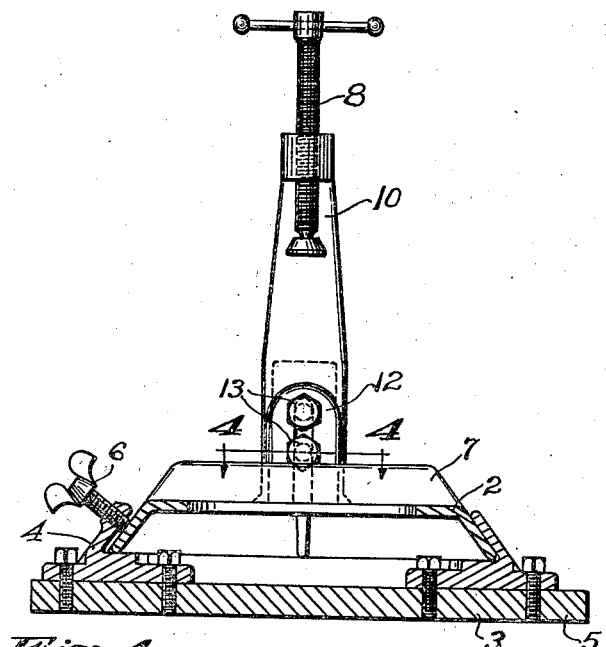
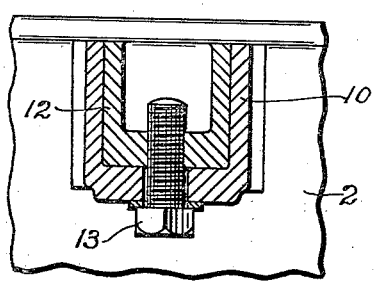

Patented Apr. 1, 1947

2,418,332

UNITED STATES PATENT OFFICE 2,418,332

GENERATOR TESTING STAND

Allen Burrows, Providence, R. I.

Application March 25, 1944, Serial No. 528,141

1 Claim. (Cl. 248—23)

This invention relates to apparatus with the aid of which small electric generators and motors may be conveniently tested.

Because the generators of motor vehicles run continuously and are therefore subjected to very severe service, they frequently require repairs. Such repairs may consist simply in turning down the commutators, renewing or fitting the brushes, and the like, or they may also involve repairs to the windings, mending an open circuit, a short circuit, or correcting various other defects. For this purpose a generator must be removed from the vehicle in which it is installed, the necessary repairs are made on it, and it is then re-installed, the motor is started up, and the performance of the generator is observed. If it does not perform correctly, then it usually must be taken out again, the trouble located, remedied, and then it must again be mounted correctly in the car and tested by its operation while being driven by the motor. This involves labor and the expenditure of much time.

The present invention aims to devise a relatively simple piece of equipment with which much of the time and labor so spent can be saved. Stated more specifically, it is the chief object of the invention to devise an inexpensive apparatus with which the generator can be tested after the repairs on it have been completed, and before re-installing it in the vehicle, so that if additional repairs are necessary they can be made at once. Then the generator can be tested again and it need not be replaced in the vehicle until it operates correctly.

While testing equipment is available for this purpose, it is so expensive (costing several hundred dollars) that only the very large repair shops can afford it. This invention provides an extremely inexpensive testing stand which, with the aid of two other inexpensive devices usually available, even in a small repair shop, forms an apparatus entirely suitable for making those tests necessary on the small generators and starting motors with which motor vehicles are equipped.

The nature of the invention will be readily understood from the following description when read in connection with the accompanying drawings, and the novel features will be particularly pointed out in the appended claims.

In the drawings,

Fig. 1 is a plan view of an apparatus embodying this invention;

Fig. 2 is a side elevation of the apparatus shown in Fig. 1;

Fig. 3 is a vertical, sectional view taken substantially on the line 3—3 of Fig. 2, the generator, however, being omitted; and Fig. 4 is a horizontal, sectional view on the line 4—4 of Fig. 3.

Referring first to Figs. 1, 2 and 3, the testing stand there shown comprises a slide 2 mounted on two rails 3 and 4, both of which are provided with ears drilled or punched to receive bolts by means of which they may be secured to a work bench or other suitable base indicated at 5. The rails are essentially alike except that the rail 4 is provided with a series of thumb screws 6 by means of which the slide may be clamped in a fixed position. Both rails have an undercut formation on their adjacent edges to fit the opposite sloping edges of the slide 2, as clearly shown in Fig. 3. Also, the slide is provided with two ribs 7—7 extending transversely thereof at right angles to the rails or guides 3 and 4. The generator G to be tested is supported on these rails, and it is clamped firmly to them by a screw 8 threaded through the forward or overhanging portion of an arm 10, the axis of the screw intersecting the slide midway between the ribs. For convenience in manufacture and shipment, this arm is releasably secured to a bracket 12 formed integral with the slide 2, the base of the arm being slotted vertically to receive the shanks of two bolts 13, by means of which it may be fastened securely to the bracket. This construction also provides for the vertical adjustment of the arm toward and from the slide.

In setting up this apparatus the automobile repair mechanic mounts a small motor 14 on the base 5 where it can conveniently be connected by a belt 15 with the generator to be tested. These small motors usually are readily obtainable, second-hand devices of this kind ordinarily being very common and inexpensive. The mechanic should also obtain a cheap ammeter 16, Fig. 2, and mount it in some convenient location, connecting a pair of leads 17 to it so that they can readily be secured to the terminals of the generator.

In using this apparatus the generator is placed on the ribs 7—7 with its pulley 18 aligned with that of the motor 14, and the screw 8 then is turned down until it clamps the motor securely to the slide 2. At this time the thumb screws 6 are loosened and the slide 2 is moved back far enough to facilitate the placing of the belt 15 on the pulleys of the motor in the generator, after which the slide is pulled forward until the belt is tightened up sufficiently. Then the thumb screws 6 also are tightened to clamp the slide in its adjusted position and the ammeter leads 17 are connected to the generator terminals. When the motor has come up to speed the workman can tell quickly whether the generator is performing normally or not. If it does not operate satisfactorily, he can frequently locate the trouble while the generator is on the stand and is being driven by the motor. Often-times he can correct the trouble without removing it from the stand. At this time, also, he can fit the brushes, if new ones are needed, much more conveniently than he can when the generator is in its normal position in the vehicle. He can even readily apply a load to the generator, if he wishes to do so, by connecting it to a battery, or water box, while it remains on the stand. In fact, he can learn practically anything about the operation of the generator, while it is on the stand, that he could if he installed it in the car, and he can thus save the time and labor that would be involved in making such installation and then removing it again in the event that it did not perform satisfactorily.

While the starting motors of automobiles do not ordinarily require repairs as frequently as do the generators, nevertheless they do require repair work at times, and the apparatus herein disclosed can be used in testing them in essentially the same manner that is used in testing generators. Consequently, the term "generator" or "generators," as used in the claims, will be understood to include motors.

Because the stand itself consists simply of the two rails 3 and 4, the slide 2, and the arm 10, plus the very few parts carried by these elements, and since they are all castings and require very little machine work, the device can be manufactured very economically and can be packed in a small space for shipment. Moreover, the motor required to go with the stand usually can be obtained from second-hand sources, the ammeter is very inexpensive and, consequently, a mechanic running an individual repair business can put together a testing apparatus of this construction very economically.

Having thus described my invention, what I desire to claim as new is:

A testing stand for an electric generator, comprising a base, a slide having a horizontal plate-like body, the opposite longitudinal edges of which are inclined downwardly, said body being provided with two parallel transverse ribs extending upwardly and spaced apart to support the generator on and between them, two removable parallel rails on said base extending at right angles to said ribs and on which said slide is mounted for adjustment lengthwise of the rails, said rails having inwardly inclined flanges providing grooves in which said downwardly inclined longitudinal edges of said slide are mounted to run, screw-threaded means mounted in one of said flanges for locking said slide against movement along said rails, a bracket integral with said slide body and projecting upwardly from the rear portion thereof, an arm having its lower portion embracing said bracket and its upper portion projecting laterally to overhang the position occupied by a generator supported on said slide, a bolted connection between the lower portion of said arm and said bracket, said bolted connection being so constructed and arranged as to permit vertical adjustment of said arm on said bracket, said arm being removable from said bracket, and a hand screw threaded through the overhanging part of said arm with its axis intersecting said slide midway between said ribs, the screw being positioned to clamp the generator in its operative position on said slide.

ALLEN BURROWS.

REFERENCES CITED

The following references are of record in the file of this patent:

UNITED STATES PATENTS

| Number | Name | Date |
| --- | --- | --- |
| 1,394,215 | Onan | Oct. 18, 1921 |
| 1,418,655 | Klemmer | June 6, 1922 |
| 1,452,905 | Beehler | Apr. 24, 1923 |
| 717,226 | Liebich | Dec. 30, 1902 |
| 1,088,451 | Rilance | Feb. 24, 1914 |